under 35 U.S.C. 154(b) by 43 days.

(12) United States Patent
Taft et al.

(10) Patent No.: US 6,665,634 B2
(45) Date of Patent: Dec. 16, 2003

(54) TEST SYSTEM FOR TESTING DYNAMIC INFORMATION RETURNED BY A WEB SERVER

(75) Inventors: Frederick D. Taft, Corvallis, OR (US); Debra L. Johnson, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 43 days.

(21) Appl. No.: 10/029,072

(22) Filed: Dec. 21, 2001

(65) Prior Publication Data

US 2003/0120464 A1 Jun. 26, 2003

(51) Int. Cl.[7] ............................................. G06F 17/30
(52) U.S. Cl. ...................................... 702/186; 702/193
(58) Field of Search ................................. 702/186, 193, 702/FOR 160, FOR 170, FOR 171; 709/203, 205, 216, 217, 218, 219, 224, 225, 226, 227, 228, 229; 713/162, 185, 200, 201, 202; 707/10, 203, 517

(56) References Cited

U.S. PATENT DOCUMENTS

| 5,784,553 | A | * | 7/1998 | Kolawa et al. ................ 714/38 |
|---|---|---|---|---|
| 6,182,245 | B1 | * | 1/2001 | Akin et al. .................... 714/38 |
| 6,226,752 | B1 | * | 5/2001 | Gupta et al. ................. 713/201 |
| 6,269,370 | B1 | * | 7/2001 | Kirsch .......................... 707/10 |
| 6,353,850 | B1 | * | 3/2002 | Wies et al. .................. 709/203 |
| 6,374,359 | B1 | * | 4/2002 | Shrader et al. ............. 713/201 |
| 6,381,654 | B1 | * | 4/2002 | Brawn et al. ................ 709/331 |
| 6,418,452 | B1 | * | 7/2002 | Kraft et al. .................. 707/200 |
| 6,442,606 | B1 | * | 8/2002 | Subbaroyan et al. ........ 709/224 |
| 6,463,461 | B1 | * | 10/2002 | Hanson et al. .............. 709/204 |
| 6,510,402 | B1 | * | 1/2003 | Logan et al. ................ 702/186 |
| 6,519,616 | B1 | * | 2/2003 | Zamora-McKelvy et al. .... 715/501.1 |
| 2001/0039592 | A1 | * | 11/2001 | Carden ........................ 709/245 |
| 2001/0054020 | A1 | * | 12/2001 | Barth et al. ................... 705/37 |
| 2002/0059425 | A1 | * | 5/2002 | Belfiore et al. ............. 709/226 |
| 2002/0103883 | A1 | * | 8/2002 | Haverstock et al. ........ 709/219 |
| 2002/0120787 | A1 | * | 8/2002 | Shapiro et al. ............. 709/311 |
| 2002/0143946 | A1 | * | 10/2002 | Crosson ...................... 709/226 |
| 2003/0014443 | A1 | * | 1/2003 | Bernstein et al. ........... 707/513 |
| 2003/0033367 | A1 | * | 2/2003 | Itoh ............................. 709/203 |

FOREIGN PATENT DOCUMENTS

JP         2000148620 A   *   5/2000   ........... G06F/13/00

OTHER PUBLICATIONS

Http://www.systest.com/Load.html; "Software Load And Performance Testing"; E–Commerce testing E–Business testing Software Testing; Jun. 11, 2001; 5 pages.
Http://www.empirix.com/; "Test And Monitoring Solutions For Web, Voice And Network Applications"; Empirix: Test and Monitoring Solutions; Jun. 11, 2001; 8 pages.
Http://www.shunra.com/; "SHUNRA Software–Simply Recreating The WAN"; Shunra' Network Simulation And Emulation Solutions; Jun. 11, 2001;7 pages.
Http://www.nstl.com/Other_html/webstite–ecommerce–testing.htm; "Website And E–Commerce Testing" E–Com Testing At NSTL; Jun. 11, 2001; 2 pages.

* cited by examiner

Primary Examiner—Marc S. Hoff
Assistant Examiner—Carol S W Tsai

(57) ABSTRACT

The present invention provides methods, a computer-readable medium, a software system, a system, a testing system and an article of manufacture for tracking information received by a user from a network wherein the information includes at least some dynamic information. One embodiment of the method includes the steps of parsing the information received into static information, if present, and dynamic information and validating the static information, if present, and the dynamic information.

17 Claims, 8 Drawing Sheets

FIG. 6    600

TEST SYSTEM FOR TESTING DYNAMIC INFORMATION RETURNED BY A WEB SERVER

BACKGROUND OF THE INVENTION

The present invention relates to testing the functionality of a network system and more particularly, to validating and propagating dynamic information in response from a web-based server.

Computers and other communication devices may be coupled into networks. A plurality of computers in a home may be networked together. Businesses, for example, may utilize a Local Area Network (LAN) if the devices on the LAN are located relatively close to one another such as being located in a same building. However, it should be noted that the use of fiber optic cables for LANs has extended the distances by which devices in LANs may be separated. Wide Area Networks (WANs) are used to connect a plurality of devices that are larger distances apart, such as being located in a same city.

In 1973, the first Ethernet network was developed. In the Ethernet system, a plurality of devices were connected with a cable. All Ethernet devices that shared the cable communicated using a communication system that relied on random gaps between transmissions to regulate access. Since Ethernet networks utilize a single cable, there are practical limits to the size of the Ethernet network system supported by the cable. Repeaters were inserted into the system to allow multiple segments of an Ethernet network to function in a larger environment. Bridges were added to the Ethernet system to forward Ethernet broadcasts to all nodes, but, if the system became too large, congestion resulted.

Token ring network systems were developed wherein the devices were arranged in a logical ring, and a frame that gave permission to transmit (the token) was passed along the ring until it encountered a device that desired to transmit data. After transmitting data, the device passed the token back into the ring. Such networks have been fairly reliable and remain in use today.

Routers were used to form natural boundaries for Ethernet and Token Ring networks, facilitating interconnection of the various network technologies. A form of Ethernet technology using a CSMA/CD (Carrier Sense Multiple Access with Collision Detection) network has been standardized as the IEEE 802.3 standard.

To share information on a worldwide basis, computers and other communication devices have been developed into a huge network called the Internet. Typically, a computer may be linked to the Internet by using a modem to connect it via the phone line. The modem communicates with an Internet Service Provider (ISP). Other computers or communication devices, such as those in a business, may have Network Interface Cards (NICs) that directly connect them to a LAN that is used for the business. The LAN may then be coupled to an ISP using a phone line or a high speed phone line such as a T1 line. T1 lines may handle 1.5 million bits per second, in comparison with the 30,000 to 50,000 bits per second handled by ordinary phone lines. Typically local ISPs may be connected to regional ISPs, which may be connected to world ISPs, forming a backbone for information transfer around the world. In this manner, every computer or communication device is connected to every other computer or communication device on the Internet. In addition, wireless access to the LANs, the public-switched telephone network (PSTN), the mobile telephone network, and the Internet is being standardized, wherein the standard is presently designated "Bluetooth", so that any Bluetooth device anywhere in the world can connect to other Bluetooth devices in its proximity.

In general, all of the devices on the Internet may be categorized as either a client or a server or both. Servers provide services, and clients use the services. A server may, for example, be a web server, an e-mail server, an FTP server, a Gopher server, or a telnet server. Each device on the Internet is assigned a unique address called an Internet protocol (IP) address. Such addresses are typically 32 bit numbers which are four numbers arranged in octets that can have values from 0 to 255, i.e., $2^8$ possible numbers. Servers are generally given static addresses which are not often changed. The device dialing into the ISP via a modem is assigned an IP address by the ISP when it dials in. The IP address for the device is unique for the network access session and may be a different IP address if the device dials in at a later time. If desired, the user may look up his current IP address and the name of the device he is using by using a predefined command.

Thus, using a browser, the user may type a Uniform Resource Locator (URL) using the IP address or using a readable format such as "http:/www.ieee.org". "HTTP" (indicated by either of capital letters or small letters) is the protocol for moving hypertext files across the Internet. The HTTP protocol requires a HTTP client program on one end, and an HTTP server program on the other end. HTTP is the most commonly utilized protocol used in the Internet. In the example above, the "www" represents the host name, "ieee" represents the domain name, and "org" represents the top level domain name. The company or entity that hosts the domain creates the host name. The host name "www" has become so common that many hosting entities either omit it or replace it with a host name that is more specific to the specific area of the site. ISPs, various name servers, universities, and many companies maintain databases or servers (Domain Names Servers, DNS) that map domain names to IP addresses. Thus, when a user types in a URL into a browser, the browser extracts domain name and passes it to a DNS, and the DNS returns the IP address for the domain name. More than one name server may be utilized for a transaction, for example, when the top level domain name is obtained from a separate name server. The various services are typically available through different ports of the server. That is, e-mail may be sent to one port and an Internet request may be sent to another port for a Web server. Once a client is connected to a service using the port specific for that service, the client accesses the service using a specific protocol. Typically, where the client is obtaining information from the Internet, the client is communicating with a Web browser. Where the client requests "GET filename" in HTTP protocol, the server sends the contents of the named file and disconnects. Security may be added to the process. Where the file information on a Web page is static, i.e., is not changed unless the creator of the page changes the information, the transfer of information from the server to the client is very straightforward.

Users or clients in a network system may often request dynamic information, which is then generated by the network system. In such a system, the server is not simply looking up a Web page, but is actually processing information and generating a page based on the query by the user. However, as the dynamic data proceeds through the network system, typically only the final data output is measured to determine whether desired steps sought by the user are being implemented. Previous work in checking data has required extensive programming to run additional test cases. Also, there are no systems that provide for parsing of static and dynamic information from a single response. Thus, there presently is no efficient system for tracking the dynamic data through its various steps.

SUMMARY OF THE INVENTION

The present invention provides a method, computer-readable medium, testing system and article of manufacture for tracking information received by a user from a network wherein the information includes at least some dynamic information. The method includes the steps of parsing the information received into static information, if present, and dynamic information and validating the static information, if present, and the dynamic information.

DETAILED DESCRIPTION OF THE PREFERRED EMBODIMENT

The present invention provides a method and testing system that parse information into static and dynamic information and test the functionality of a networked system by stepwise tracking of the dynamic information. The method of the invention is typically implemented using software. By placing tags to indicate which portions of information are dynamic information, the system of the present invention facilitates extraction and validation of the dynamic information in a web-based service response. Once validated, such information may be inserted into subsequent requests. The test cases or suites that are utilized to validate dynamic information are easily extensible to include additional test classes as well as test cases.

Figure 1:
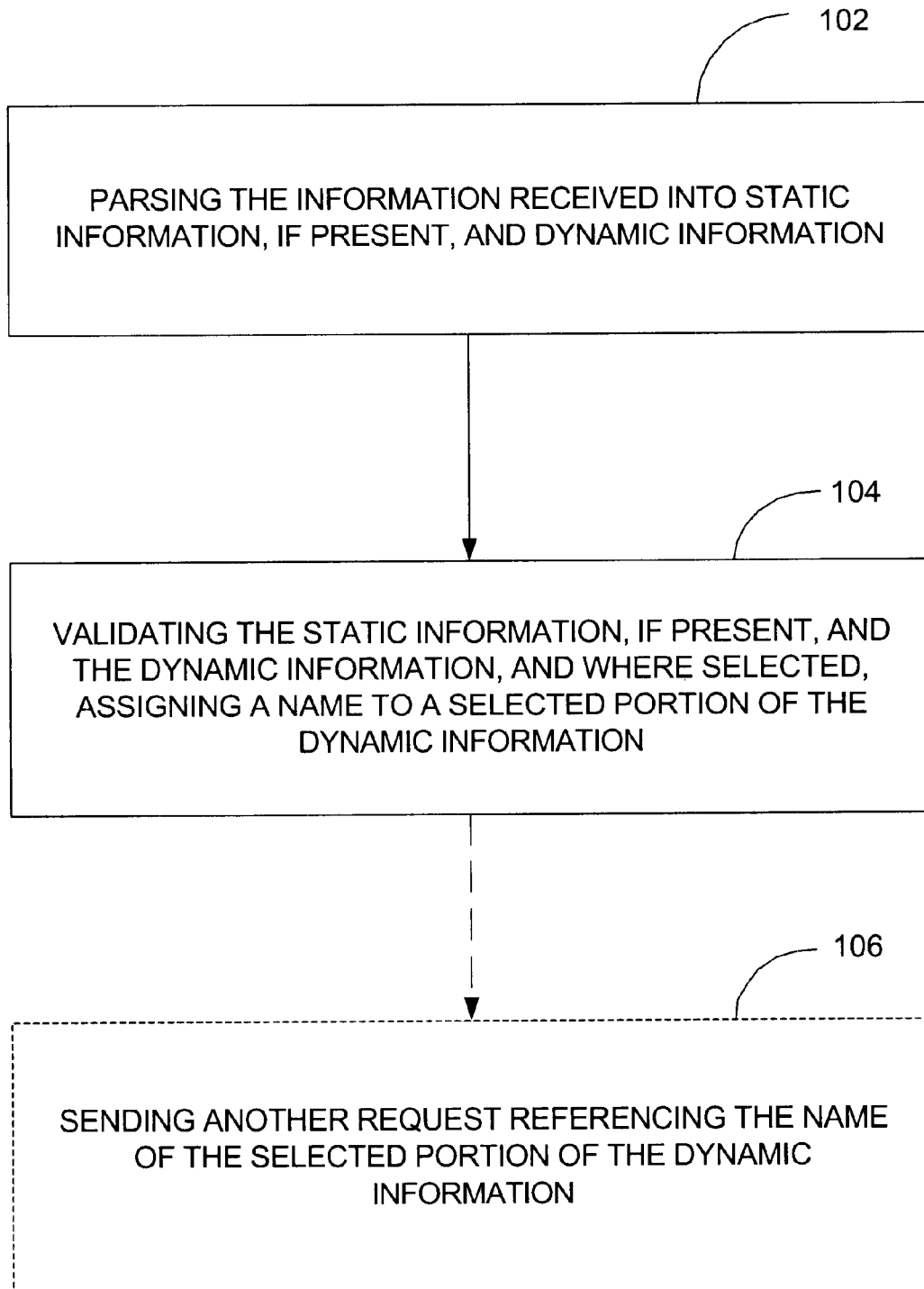
FIG. 1 is a flow chart for a first embodiment of steps in accordance with the method of the present invention.

As shown in FIG. 1, the present invention provides a method of tracking information received by a user from a network wherein the information includes at least some dynamic information. The method includes the steps of parsing 102 the information received into static information, if present, and dynamic information and validating 104 the static information, if present, and the dynamic information. Validating 104 the static information, if present, may include using a comparison string to check for a match. When the information received is parsed into static information, if static information is present, and dynamic information, the information received may be compared with a predetermined comparison string that has tags inserted to distinguish static information from dynamic information. Using the tags, the dynamic information is extracted and validated. Static information is compared to the static information portion of the predetermined comparison string.

The dynamic information may be validated by checking the extracted dynamic information using a predetermined test suite to determine the functionality of the web-based services. Test suites are provided in a test definition repository such as a database or property file so that a test suite applicable to a requested web-service may be selected. A default test suite is provided where no particular test suite is specified.

Where an asset ID is expected, validation may include verifying that an ID received for dynamic information is a valid asset ID. A name may be assigned to a selected portion of the dynamic information received, and the selected portion may be saved under the name, enabling the system to reference the name of the selection of the dynamic information in a later request for information or compare it against dynamic information in a later response, i.e., when a subsequent response must return the same piece of information retrieved by an earlier response.

Validating dynamic information may be done in several ways. For simple things, such as a date or an asset identification (ID) (numeric string), one can add a validate request to the test system, which will then automatically validate the dynamic value. For dynamic information that represents a URL, there are two choices: 1) use the built-in URL validator, the system verifies that the string represents an accessible URL; and 2) define another test case which will retrieve the contents of the URL represented by the dynamic information and validate its contents. For other types of dynamic information, additional test cases may be defined that validate the original piece of dynamic information.

Figure 2:
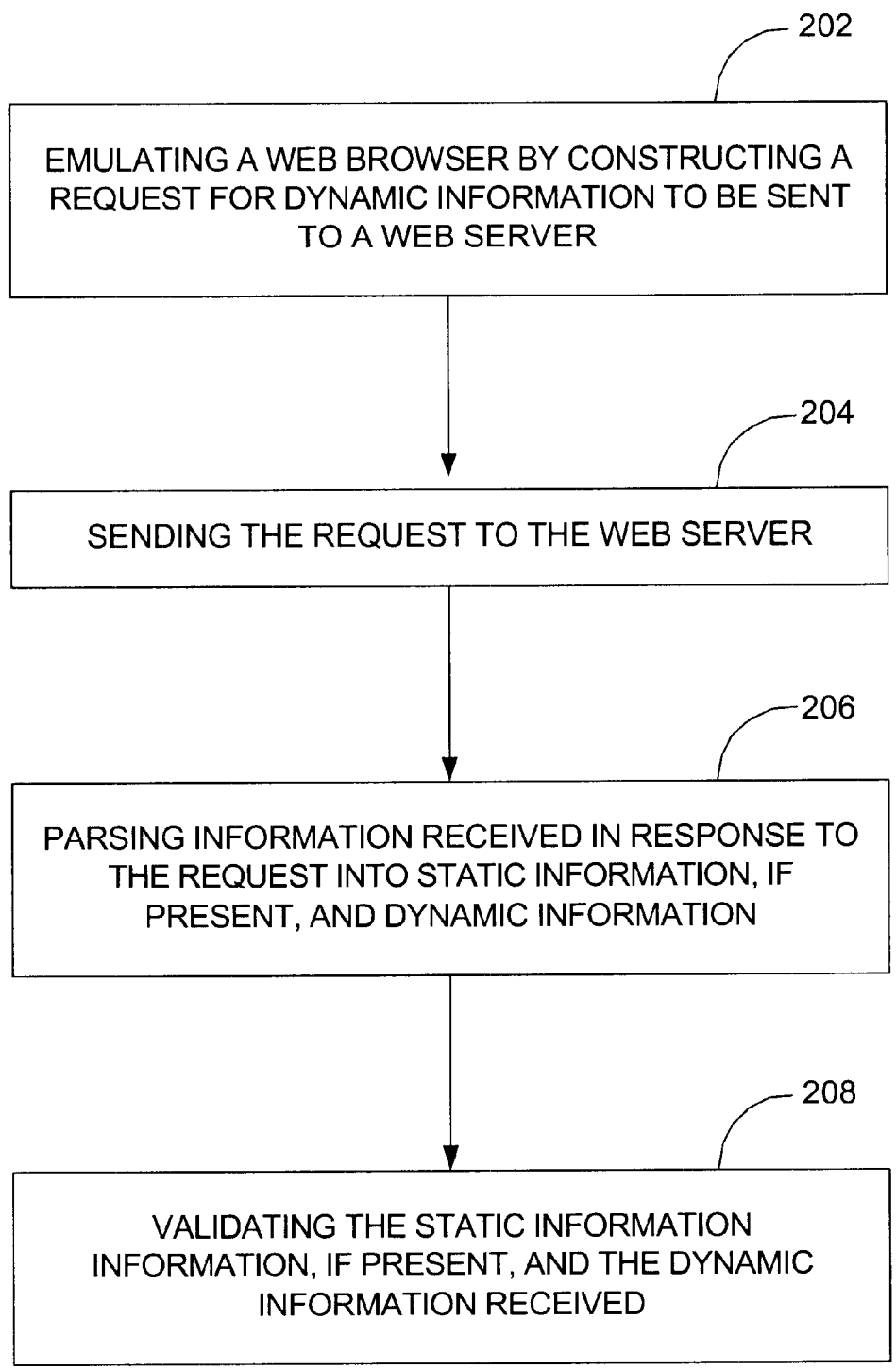
FIG. 2 is a flow chart for a second embodiment of steps in accordance with the method of the present invention.

FIG. 2 is a flow chart showing a second embodiment of a method of testing a functionality of a networked system that provides at least some dynamic information in accordance with the present invention. The method includes the steps of emulating 202 a web browser by constructing a request for dynamic information to be sent to a web server, sending 204 the request to the web server; parsing 206 information received in response to the request into static information, if present, and dynamic information, and validating 208 the static information, if present, and the dynamic information received. If static information is present, validating the static information is conducted by matching the static information with a predetermined set of information. Where dynamic information is present, such information is typically validated by sequentially running a predetermined series of test cases. Test cases include individual tests to be conducted and the expected results for each. Sequencing of the predetermined series of test cases is typically controlled based on results of a previous test case. Also, validation may be accomplished as described above.

Figure 3:
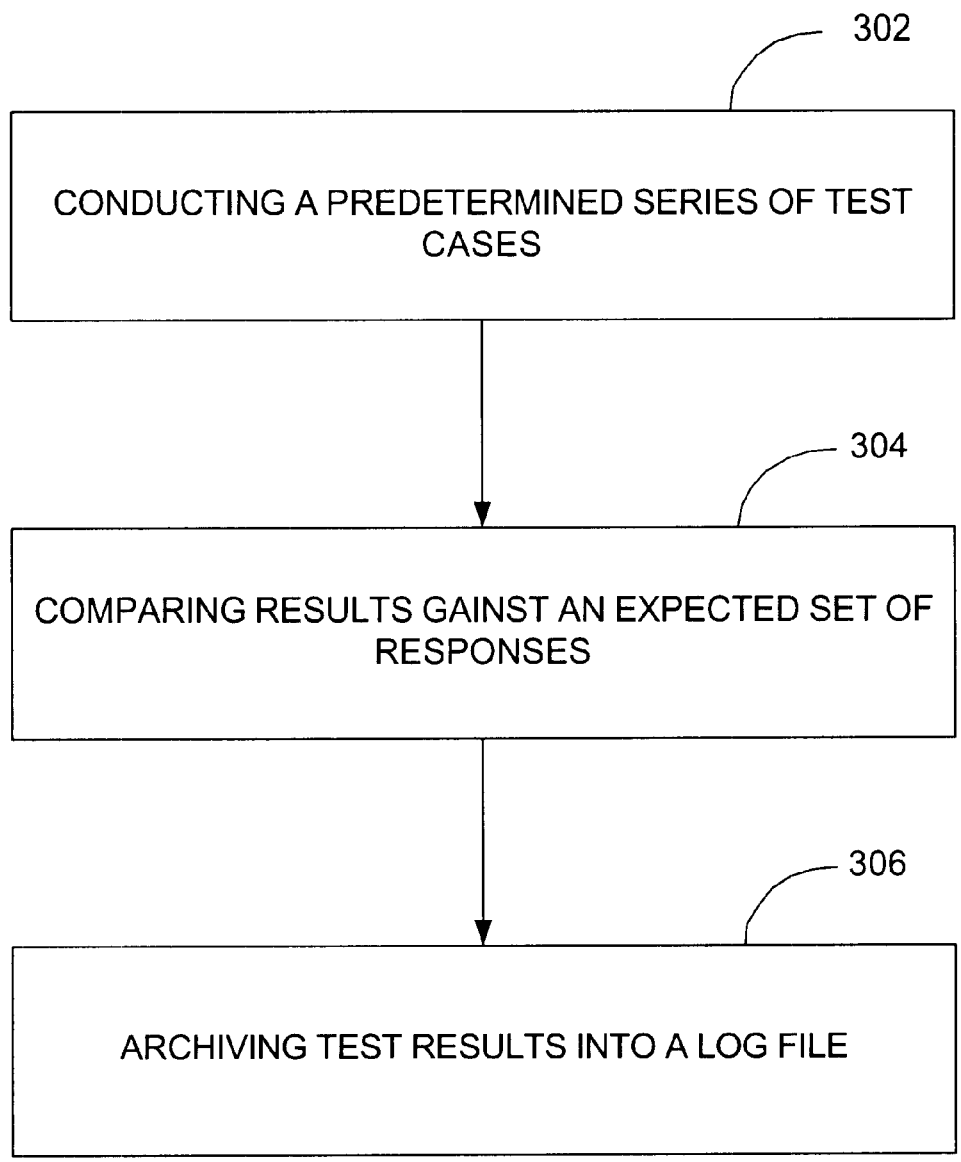
FIG. 3 is a flow chart for a third embodiment of steps in accordance with the method of the present invention.

FIG. 3 is a flow diagram of a third embodiment of a method of testing a set of services provided by a web server in accordance with the present invention. The method includes the steps of conducting 302 a test case, comparing 304 results against an expected set of responses, and archiving 306 test results into a log file. Thus, each test is run one at a time, following the steps in a loop fashion for a series of tests. Again, sequencing of the predetermined series of test cases is generally controlled based on results of a previous test case. Where desired, conducting the predetermined series of test cases may include using regression tests.

Figure 4:
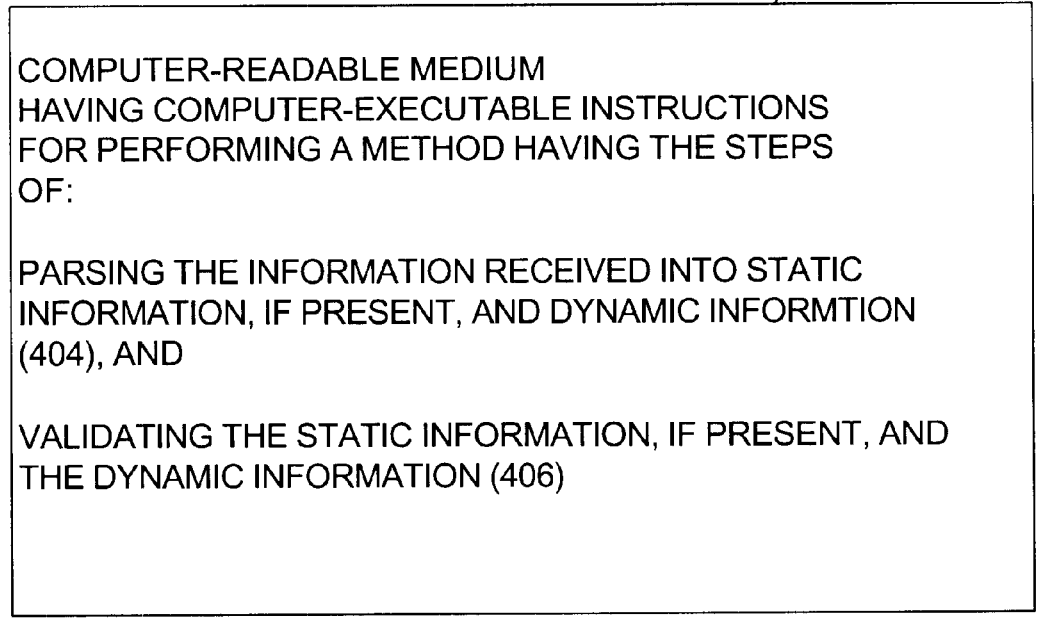
FIG. 4 is a block diagram of one embodiment of a computer-readable medium having computer-executable instructions for performing a method in accordance with the present invention.

FIG. 4 is a block diagram of one embodiment of a computer-readable medium with computer-executable instructions for performing steps of a method in accordance with the present invention. The computer-readable medium is useful in association with a client computer coupled to a server via a computer network where the computer network provides a network connection for transmitting data from the server to the client computer and from the client computer to the server. The computer-readable medium has computer-executable instructions for performing a method of tracking information received by a client from a network wherein the information includes at least some dynamic information. The method includes the steps of: parsing 402 the information received into static information, if present, and dynamic information and validating 404 the static information, if present, and the dynamic information. Validating the static information, if present, may include using a comparison string to check for a match. Parsing the information received into static information, if present, and dynamic information typically includes comparing information received with a predetermined comparison string, wherein tags inserted into the predetermined comparison string are used to distinguish static information from dynamic information, extracting the dynamic information, and comparing static information of the predetermined comparison string to received information that is static. For the dynamic information that is extracted, validation generally includes checking the functionality of web-based services utilizing a predetermined test suite. Test suites are generally selected from a test definition repository such as a test case database or property file for testing desired web-based services. Where an asset ID is expected for dynamic information, validation may include verifying that an ID received is a valid asset ID. Validating the dynamic information may also include assigning a name to a selected portion of the dynamic information received and saving the selected portion under the name. Where the name has been assigned to the selected portion of the dynamic information received and the selected portion of dynamic information has been saved under the name, another request may be sent later referencing the name of the selected portion of the dynamic information.

Figure 5:
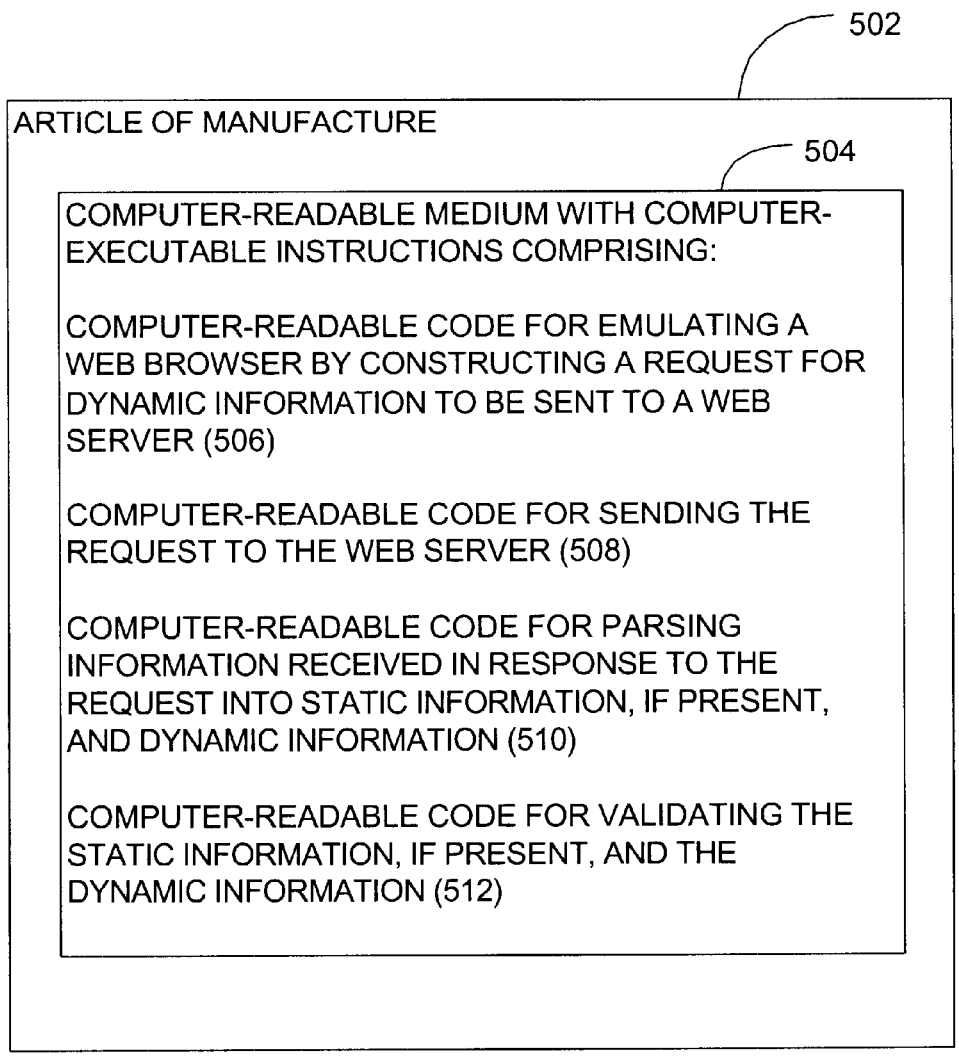
FIG. 5 is a block diagram of one embodiment of an article of manufacture having a computer-readable medium with computer-executable instructions with computer-readable code for implementing steps in accordance with the present invention.

FIG. 5 is a block diagram of one embodiment of an article of manufacture 502 having a computer-readable medium with computer-executable instructions 504 with computer-readable code for implementing steps in accordance with the present invention. Thus, the article of manufacture includes 502 software for testing a functionality of a networked system when a client computer makes a request for at least some dynamic information. The computer-executable instructions include computer-readable code for emulating 506 a web browser by constructing a request for dynamic information to be sent to a web server, computer-readable code for sending 508 the request to the web server, computer-readable code for parsing 510 information received in response to the request into static information, if present, and dynamic information, and computer-readable code for validating 512 the static information, if present, and the dynamic information received. The static information, if present, may be validated by matching the static information with a predetermined set of information. The dynamic information may be validated by sequentially running a predetermined series of test cases, and sequencing of the predetermined series of test cases is generally controlled based on results of a previous test case. Also, validation may be performed as described above.

Figure 6:
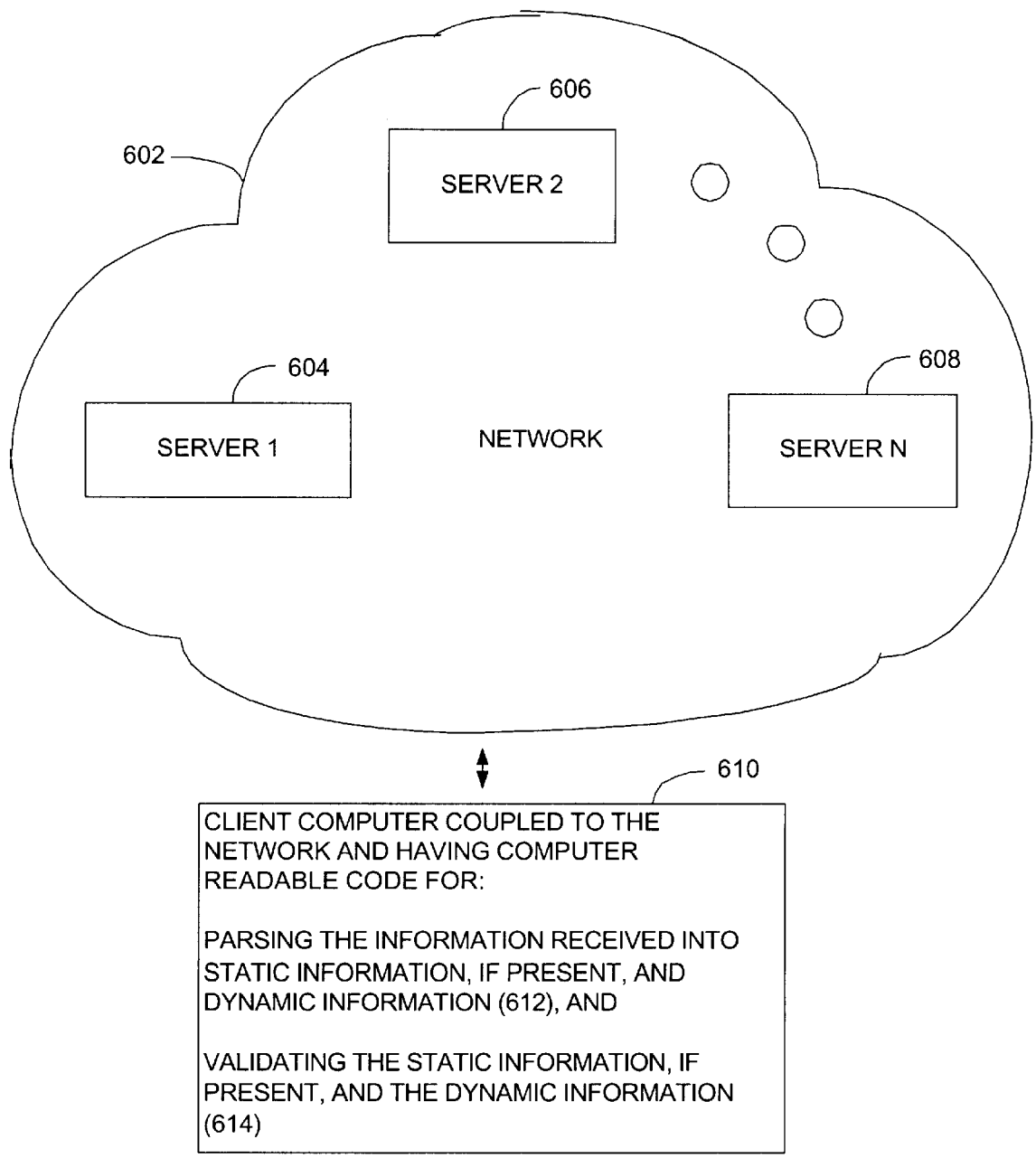
FIG. 6 is a schematic representation of one embodiment of a networking system having a client computer for implementing the present invention.

FIG. 6 is a schematic representation of one embodiment of a networking system having a client computer for implementing the present invention. In a computer networking environment, a system 600 for tracking information requested by a client computer 610 from a server 1, 2, . . . , N (N=a predetermined positive whole number) in a network 602 wherein the information includes at least some dynamic information may include a plurality of servers 604, 606, 608 connected by the network 602 and at least one client computer 610 coupled to the network. In the embodiment illustrated in FIG. 6, at least one client computer 610 requests information at least part of which is dynamic information and has installed thereon, computer-readable code for parsing 612 the information received into static information, if present, and dynamic information and validating 614 the static information, if present, and the dynamic information. Validating the static information, if present, may include using a predetermined comparison string to check for a match. The predetermined comparison string may include tags inserted into the predetermined comparison string to distinguish static information from dynamic information. Parsing 612 typically includes extracting the dynamic information and comparing static information of the predetermined comparison string to received information that is static. For the dynamic information that is extracted, validation 614 generally includes checking the functionality of web-based services utilizing a predetermined test suite. Validating the dynamic information may include, where an asset ID is expected, verifying that an ID received for dynamic information is a valid asset ID and where selected, assigning a name to a selected portion of the dynamic information received and saving the selected portion under the name. Thus, where the name has been assigned to the selected portion of the dynamic information received and the selected portion of dynamic information has been saved under the name, another request referencing the name of the selected portion of the dynamic information may be sent.

Figure 7:
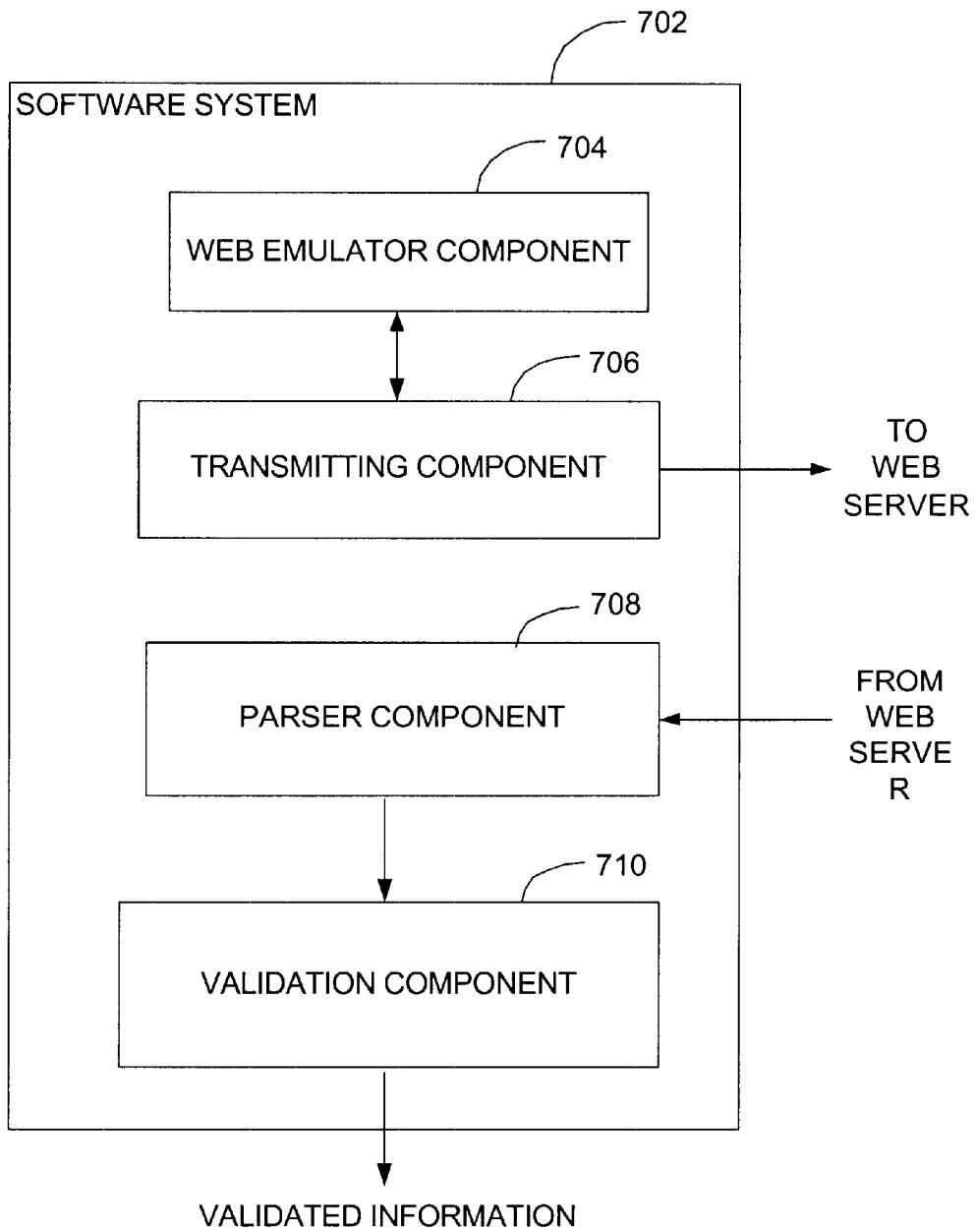
FIG. 7 is a block diagram of one embodiment of a software system with components for implementing the present invention.

FIG. 7 is a block diagram of one embodiment of a software system with components for implementing the present invention. The software system 702 may be used for testing a functionality of a networked system that provides at least some dynamic information in response to a client request. The software system 702 includes a web emulator component 704 for emulating a web browser by constructing a request for dynamic information to be sent to a web server and a transmitting component 706, coupled to receive the request from the web emulator component 704, for sending the request to the web server. A parser component, 708 is coupled to receive information in response to the request and parses the information into static information, if present, and dynamic information. A validation component 710 is coupled to receive the static information, if present, and the dynamic information from the parser component 708. The validation component 710 validates the static information, if present, and the dynamic information. The validation component 710 may validate static information, if present, by matching the static information with a predetermined set of information. The validation component 710 typically validates dynamic information by sequentially running a predetermined series of test cases, generally controlling sequencing of the predetermined series of test cases based on results of a previous test case, as described more particularly below. Also, validation may be accomplished in an alternative fashion described above.

The present invention may be embodied in a general purpose web server test engine that provides a generic framework that may be used to test a set of services provided by a web server. For a selected web service, a series of test cases, wherein the series of test cases comprise a test suite, may be sequentially conducted, and the results may be compared with an expected set of responses. Typically, the test results are then archived into a log file. The sequencing of the test cases can be controlled based on the results of a previous test case, allowing certain test cases to be skipped, should a particular test case fail, while still allowing other independent portions of the test suite to be conducted. This flow control information is kept separate from the test case descriptions to make it easier to allow new test case flows to be constructed using existing test cases, making this framework ideally suited for running regression tests for a web-based service.

The architecture of the test engine is extensible, allowing the test creator, for example, to plug in a test-specific Java® module, termed a "test personality". By adhering to a well-defined interface, the test personality may be used to customize the test engine.

In one embodiment, the test engine may be utilized as a stand-alone Java® application, using Java® tools for all database and Internet interactions. The system on which the test engine is running does not require a web server. Further, the test engine may reside within a firewall, working in conjunction with a proxy server to allow a web server outside the firewall to be tested. However, there is nothing inherent in the architecture of the test engine that prevents it from running on a system outside the firewall, and the test engine may even test a web server that is co-located. In one embodiment, the test engine supports communication using either the HTTP or the HTTPS protocols.

Figure 8:
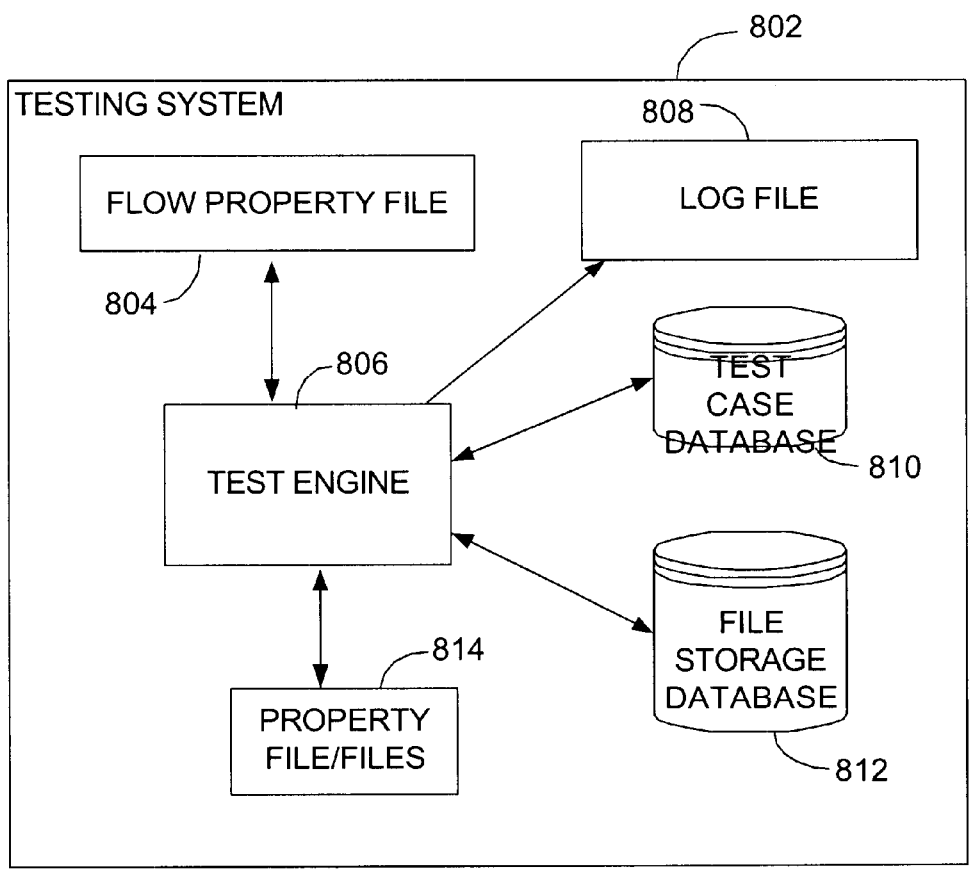
FIG. 8 is a block diagram of one embodiment of a testing system for implementing the present invention.

FIG. 8 shows a block diagram of one embodiment of a testing system in accordance with the present invention for testing a functionality of a networked system with a web server that provides at least some dynamic information in response to a client request. The testing system 802 includes a test engine 806 that provides a set of tools for accessing web-based services and testing dynamic information to validate the response. Coupled to the test engine 806 are a flow property file 804, a log file 808, a test definition repository 810 (such as a test case database or property files when a database is not present), a file storage 812 and at least one property file 814.

The test definition repository 810 defines test cases to be conducted and information about expected results. The test results, whether they are text-based (HTML, XML, etc.) or binary test results (images, audio, etc.) are stored as file references pointing into the file storage 812.

The file storage 812 is used to store a file with a comparison string representing an expected response from the web server. If the comparison string represents content of text having a tag that indicates dynamic information, then the comparison string may contain embedded references to dynamic information. If the comparison string represents binary data (images, audio, etc.), then the file contains only raw, static information. Use of the tags allows for easy modification of test results since the information is stored within the file storage 812 and not the test definition depository 810. The file storage 812 may also be used to hold files containing text data to be inserted into a later request when dynamic information insertion is indicated by a tag.

At least one property file 814 provides details about a test suite to be conducted. Property files contain information such as the database to be connected to, the base location of the file storage 812, the log file 808 used to record test results and the name of the test suite to be conducted. Property files may also be used to provide information for a current test personality module. In one embodiment, the names of the property files are specified as a first set of command line arguments in the test engine software application. Multiple property files may be specified on the command line, and they will be loaded in the order specified and merged together, allowing the property information to be partitioned and portions shared across separate test engine web-server testing instances. For example, the user may choose to create a separate property file to hold each of the following information: database properties, proxy properties, log file properties, etc.

The flow property file stores flow information. Since the ordering or flow of the test cases is separated from the definitions of the test cases, reuse is facilitated in different test flows. Further, the flow information is kept in a property file and not the test case database 810, making it easier for new test flows to be constructed and conducted without modifying the test case database 810. In one embodiment, the name of the flow property file is specified as the last command line argument in the test engine software application.

The test engine 806 writes the test results to the log file 808, where the test results are stored. In one embodiment, output may be written as XML. When a test fails, as much context about the current operation as possible is logged. Depending on why the test failed, the context may include references to files which contain the actual and the expected content. When a test suite has been completed, a log entry is recorded, indicating the total elapse time for the test suite to be completed. The elapse time may be used to determine the load or responsiveness of a web server being tested. It also writes out the number of tests passed, the number of tests failed, and the number of tests skipped.

The test engine 806 controls the execution of a test suite. In one embodiment, the test engine 806 may be a Java® application that provides a set of tools for accessing web-based services using the standard HTTP GET and POST methods. For the POST method, the application may simulate the transmission of field-based form data, file-content data, and simple blocks of text.

Since determining whether test results received from web-based services are correct may require dynamic information (such as times, URLs, and Ids) as well as static information and test strings (such as insertion of a reference to an asset ID) to be sent to the web server in a subsequent request, the test engine 806 provides for preprocessing each request string and post processing each response string. Tags are used to indicate dynamic information in a request string so that the test engine 806 can then pass the requested action to the test personality module for processing. When a response is received, the expected response is retrieved from the file store and is then processed for any special tags. In this case, the tags indicate the location of dynamic information within the response and provide an indication of how the dynamic information is to be processed. Processing options typically include validation and saving for future use. When the test engine 806 attempts to validate a response, the validation may be accomplished as desired by the test case developer. When a tag is used to indicate that a piece of dynamic information represents a URL, the URL validator may simply verify that the information represents an accessible URL. Alternatively, the dynamic information may be saved, a subsequent test case defined which does an HTTP GET action for the saved value, and the results may be compared to the saved dynamic information bits.

The validation of a response from a web server is complicated since the bulk of the response may be static information with dynamic information located at various positions within the static information. It is not always intuitively obvious how to validate the dynamic information. For example, where a response returns a time/date pair, it is relatively easy to determine if the time/date pair is a valid time/date pair, but it is very difficult to determine if the pair is the correct time and date. Other dynamic portions of information such as IDs (asset IDs, member IDs, collection IDs, etc.) present similar problems. Further, the dynamic information may need to be used by subsequent test cases. To accommodate this condition, as the response string is being processed, once a portion of dynamic information has been verified, the portion of dynamic information is typically passed to the test personality module for storage, facilitating retrieval of the information by subsequent requests.

Requests sent to a web server are typically not static, though the greater portion of the request may indeed be static. The test engine 806 preprocesses each request string and each response URL referring to the file storage database and searching for tags that indicate dynamic information. Typically, dynamic information may be extracted from the property files by a test personality module or be extracted from the results returned by an earlier test case. If, upon searching for the portion of dynamic information located by the tags, the portion of dynamic information does not exist, then an empty string is inserted at the tagged location. Typically, the value identified by the name is retrieved, may be URL-encoded and then inserted.

It is important to distinguish between the first time a dynamic value is validated and subsequent validations. For example, where a URL is returned representing an image, the first time the URL is returned, it is desirable to compare it against a pre-stored version of the image to be assured that the URL really refers to the correct information. For any subsequent tests, it may be sufficient to simply verify that the returned URL string matches the URL string returned by the first request. The solution of the present invention is the use of special preselected tags to control the type of comparison used to validate the portion of dynamic information.

In order to locate where dynamic information is located within a response string, each test case has certain "content" data associated with it that represents the expected response string. Embedded within the expected response string are preselected tags that aid the test engine in locating and validating the dynamic information. Typical examples are preselected tags for causing the test engine 806 to extract the corresponding dynamic value from the response string and pass it to the test personality module for validation, for causing the test engine 806 to save validated dynamic values using an indicated name, for causing the test engine 806 to extract the corresponding dynamic value from the response string and pass it to the test personality module for saving without validating it, for causing the test engine 806 to extract the corresponding dynamic value from the response string and to pass it to the test personality module for saving while also saving embedded URLs, and causing the test engine 806 to extract the corresponding dynamic value from the response string and to pass it to the test personality module for comparison of the string against a named value that was previously stored in the test personality module (where the portion of dynamic information being validated is a URL, the URL strings are compared, not the contents of the URL—to validate the contents of an embedded URL, the URL is first saved in a dynamic values collection and a test case is then defined that retrieves and validates the URL contents).

With respect to cookies, each test case is given the opportunity to provide test case-specific cookie information. Thus, if a test case expects that an external server has provided a cookie, then the test case is given the opportunity to dynamically construct the cookie (typically called a pseudo-cookie) before the test is conducted. At the same time as the test suite is conducted, if the server requests that a cookie be created, the test engine 806 saves such information and includes it in subsequent requests to the web server.

At least one property file 814 may specify at least a default test personality module for performing custom initialization, cookie construction and variable management. In addition, the property file or files may optionally provide a test personality file for each test suite, wherein the test personality file is typically customized for performing custom initialization, cookie construction and variable management for the particular test suite. For example, for a Test Personality Java® class, the test personality file extends the class and overrides methods that are to be customized. In one embodiment, the location of the test personality class object is specified within a property file, and is retrieved at startup time.

The test system of the present invention automatically provides a default test personality. Using a property file, the user may specify the class name of a different test personality if desired. The property files may also be used to define dynamic values that may be used to 'seed' the set of stored dynamic values. However, only one test personality may be in use at any one time.

Thus, methods, a computer-readable medium, a testing system and an article of manufacture have been described according to the present invention. Many modifications and variations may be made to the techniques and structures described and illustrated herein without departing from the spirit and scope of the invention. Accordingly, it should be understood that the methods, computer-readable medium, testing system and article of manufacture described herein are illustrative only and are not limiting upon the scope of the invention.

What is claimed is:

1. A method of tracking information received by a user from a network wherein the information includes at least some dynamic information, comprising the steps of:

parsing the information received into static information, if present, and dynamic information; and validating the static information, if present, including using a comparison string to check for a match and validating the dynamic information, wherein parsing the information received into static information, if present, and dynamic information includes comparing information received with a predetermined comparison string, wherein tags inserted into the predetermined comparison string are used to distinguish static information from dynamic information, extracting the dynamic information, and comparing static information of the predetermined comparison string to received information that is static.

2. The method of claim 1, wherein, for the dynamic information that is extracted, validating the dynamic information includes checking functionality of web-based services utilizing a predetermined test suite.

3. The method of claim 1 wherein validating the dynamic information includes, where an asset ID is expected, verifying that an ID received for dynamic information is a valid asset ID.

4. The method of claim 1 wherein validating the dynamic information includes assigning a name to a selected portion of the dynamic information received and saving the selected portion under the name.

5. The method of claim 4 wherein, where the name has been assigned to the selected portion of the dynamic information received and the selected portion of dynamic information has been saved under the name, further including sending another request referencing the name of the selected portion of the dynamic information.

6. A computer-readable medium useful in association with a client computer coupled to a server via a computer network, the computer network providing a network connection for transmitting data from the server to the client computer and from the client computer to the server, the computer-readable medium having computer-executable instructions for performing a method of tracking information received by a client from a network wherein the information includes at least some dynamic information, the method comprising the steps of:

parsing the information received into static information, if present, and dynamic information; and validating the static information, if present, and the dynamic information, wherein validating the static information, if present, includes using a predetermined comparison string to check for a match, and wherein parsing the information received into static information, if present, and dynamic information includes comparing information received with the predetermined comparison string, wherein tags inserted into the predetermined comparison string are used to distinguish static information from dynamic information, extracting the dynamic information, and comparing static information of the predetermined comparison string to received information that is static.

7. The computer-readable medium of claim 6 wherein, for the dynamic information that is extracted, validating the dynamic information includes checking functionality of web-based services utilizing a predetermined test suite.

8. The computer-readable medium of claim 6 wherein validating the dynamic information includes, where an asset ID is expected, verifying that an ID received for dynamic information is a valid asset ID.

9. The computer-readable medium of claim 6 wherein validating the dynamic information includes assigning a name to a selected portion of the dynamic information received and saving the selected portion under the name.

10. The computer-readable medium of claim 9 wherein, where the name has been assigned to the selected portion of the dynamic information received and the selected portion of dynamic information has been saved under the name, the steps further include sending another request referencing the name of the selected portion of the dynamic information.

11. In a computer networking environment, a system for tracking information requested by a client computer from a server in a network wherein the information includes at least some dynamic information, comprising:

a plurality of servers connected by the network;

at least one client computer coupled to the network, wherein the at least one client computer requests information at least part of which is dynamic information and wherein the client computer has installed thereon, computer-readable code for:

parsing the information received into static information, if present, and dynamic information; and validating the static information, if present, including using a predetermined comparison string to check for a match and validating the dynamic information, wherein the predetermined comparison string includes tags inserted into the string to distinguish static information from dynamic information, and wherein parsing includes extracting the dynamic information and comparing static information of the predetermined comparison string to received information that is static.

12. The system of claim 11 wherein, for the dynamic information that is extracted, validating the dynamic information includes checking functionality of web-based services utilizing a predetermined test suite.

13. The system of claim 11 wherein validating the dynamic information includes, where an asset ID is expected, verifying that an ID received for dynamic information is a valid asset ID.

14. The system of claim 11 wherein validating the dynamic information includes assigning a name to a selected portion of the dynamic information received and saving the selected portion under the name.

15. The system of claim 14 wherein, where the name has been assigned to the selected portion of the dynamic information received and the selected portion of dynamic information has been saved under the name, further including sending another request referencing the name of the selected portion of the dynamic information.

16. A testing system for testing a functionality of a networked system with a web server that provides at least some dynamic information in response to a client request, comprising:

a test engine, for providing a set of tools for accessing web-based services and testing dynamic information to validate the response;

a test definition repository, coupled to the test engine, for defining test cases to be conducted and information about expected results;

a file storage, coupled to the test engine, for storing a comparison string representing an expected response from the web server;

at least one property file, coupled to the test engine, for providing details about a test suite to be conducted, wherein the at least one property file further provides at least a default test personality module for performing custom initialization, cookie construction and variable management;

a flow property file, coupled to the test engine, for storing flow information; and a log file, coupled to the test engine, storing test results.

17. The testing system of claim 16 wherein the at least one property file further provides a test personality file for each test suite.

* * * * *